United States Patent
Heiskanen et al.

(10) Patent No.: US 12,540,436 B2
(45) Date of Patent: Feb. 3, 2026

(54) METHOD FOR MANUFACTURING FLUTING AND/OR LINER FOR CORRUGATED BOARD

(71) Applicant: Stora Enso OYJ, Helsinki (FI)

(72) Inventors: Isto Heiskanen, Imatra (FI); Jukka Kankkunen, Imatra (FI); Ismo Saarinen, Lappeenranta (FI); Jukka Lyyra, Jämsä (FI); Juha Korvenniemi, Oriniemi (FI); Harri Taipale, Vantaa (FI); Hannu Heikkinen, Helsinki (FI)

(73) Assignee: Stora Enso OYJ, Helsinki (FI)

( * ) Notice: Subject to any disclaimer, the term of this patent is extended or adjusted under 35 U.S.C. 154(b) by 140 days.

(21) Appl. No.: 18/561,431

(22) PCT Filed: May 13, 2022

(86) PCT No.: PCT/IB2022/054472
§ 371 (c)(1),
(2) Date: Nov. 16, 2023

(87) PCT Pub. No.: WO2022/243816
PCT Pub. Date: Nov. 24, 2022

(65) Prior Publication Data
US 2024/0254694 A1    Aug. 1, 2024

(30) Foreign Application Priority Data
May 17, 2021    (SE) .................... 2150626-6

(51) Int. Cl.
*D21F 11/12*    (2006.01)
*D21H 11/14*    (2006.01)
*D21H 27/40*    (2006.01)

(52) U.S. Cl.
CPC ............. *D21F 11/12* (2013.01); *D21H 11/14* (2013.01); *D21H 27/40* (2013.01)

(58) Field of Classification Search
CPC ........... D21F 11/12; D21F 11/14; D21F 27/40
USPC ......................................... 162/116
See application file for complete search history.

(56) References Cited

U.S. PATENT DOCUMENTS

| 3,310,363 A | 3/1967 | Russell et al. |
| 11,441,272 B2 | 9/2022 | Sippus |
| 2003/0041986 A1 | 3/2003 | Hoffman |

FOREIGN PATENT DOCUMENTS

| CN | 111315929 A | 6/2020 |
| WO | 2020046628 A2 | 3/2020 |
| WO | 2020128144 A1 | 6/2020 |

OTHER PUBLICATIONS

International Search Report from corresponding PCT application No. PCT/IB2022/054472, mailed Jun. 29, 2022.
Kirwan, Mark J., Paper and Paperboard Packaging Technology, Blackwell Publishing, 2005.
Hall, Donald D., Streamlining the broke handling, disposal process in paper mills, Pulp & Paper, Dec. 1979, vol. 53, No. 14, pp. 123-125.

*Primary Examiner* — Jacob T Minskey
(74) *Attorney, Agent, or Firm* — Greer, Burns & Crain, Ltd.

(57) ABSTRACT

A method for manufacturing fluting and/or liner for corrugated board, comprising the step(s): a) using broke obtained from manufacturing of liner in the pulp used for manufacturing of fluting wherein at least 50% of the broke is external broke from the manufacturing of liner, and/or b) using broke obtained from manufacturing of fluting in the pulp used for manufacturing of liner wherein at least 50% of the broke is external broke from the manufacturing of fluting.

14 Claims, No Drawings

METHOD FOR MANUFACTURING FLUTING AND/OR LINER FOR CORRUGATED BOARD

This application is a U.S. National Phase under 35 U.S.C. § 371 of International Application No. PCT/IB2022/054472, filed May 13, 2022, which claims priority under 35 U.S.C. §§ 119 and 365 to Swedish Application No. 2150626-6 filed May 17, 2021.

TECHNICAL FIELD

The present invention relates to a method for manufacturing fluting and/or liner for corrugated board.

BACKGROUND

Corrugated board (sometimes referred to as corrugated cardboard or corrugated fiberboard) is a packaging material which can be converted to different types of packaging solutions. Corrugated board is a fiber based material made from cellulose fibers. The fibers can be virgin fibers or recycled fibers, such as fibers from used corrugated cardboard or other materials.

The corrugated board comprises at least one corrugated medium (fluting) and at least one non-corrugated medium (liner or linerboard) glued onto a surface of the corrugated medium. For example, the corrugated board may consist of a layer of fluting glued between two layers of liner to form a sandwich structure. The sandwich structure can be formed in different ways such as in single, double, and triple walls as described, e.g., in Kirwan M., J., Paper and Paperboard. Packaging Technology, Blackwell Publishing 2005.

One difficulty when producing corrugated board is the adhesion of the liner to the fluting. Too low adhesion causes delamination and addition of too much adhesive to ensure that the adhesion is sufficient can cause washboarding and curl of the corrugated board. It is important that the adsorption of the added glue into the liner and/or corrugated medium is optimal. If the adhesive is not adsorbed by the fluting/liner delamination will occur and the same will happen if it is adsorbed too much into the fluting/liner.

There are different kinds of corrugated board qualities, and these may comprise different types of liners and corrugated media. Containerboard (also known as CCM or corrugated case material) is a type of paperboard specially manufactured for the production of corrugated board. It includes both linerboard and corrugating medium (or fluting), the two types of paper that make up corrugated board. Since containerboard is made mainly out of natural unbleached wood fibers, it is generally brown, although its shade may vary depending on the type of wood, pulping process, recycling rate and impurities content.

Examples of different types of liners are kraftliner and testliner. Kraftliner is typically produced from kraft pulp that can be bleached or unbleached and may comprise one or more layers/plies wherein the top layer/ply is often optimized to provide a good printing surface and good moisture resistance. Testliner is mainly produced from recycled corrugated board and is commonly manufactured in two layers/plies. Due to the presence of recycled fibers, testliner may typically have lower mechanical strength, particularly lower burst strength, than kraftliner. Kraftliner is frequently used in packaging boxes with higher demands on strength properties.

Fluting is formed from paper or paperboard which has been corrugated using heat, moisture and pressure using a corrugator.

Fluting is often prepared from neutral sulfite semi chemical (NSSC) pulp. NSSC pulp, which is normally made from hardwood species, is noted for exceptional stiffness and high rigidity making it suitable for use in fluting. Neutral Sulfite Semi-Chemical (NSSC) pulping is an old process that it is well known in the field of paper pulping. One of the reasons for using NSSC pulping is the high yield, typically above 60%. In NSSC pulping, the cooking liquor comprises sulfite, such as $Na_2SO_3$ or $(NH_4)_2SO_3$ and a base, such as NaOH or $Na_2CO_3$. "Neutral" means that the pH of the NSSC cooking liquor is generally between 6 and 10. The pulp can be cooked in a batch or continuous cooker. Normally, the cooking time is between 5 minutes and 3 hours and the cooking temperature is 160-200° C. The NSSC pulp comprises comparatively high amounts of residual lignin, such as 15-20%, which makes the NSSC pulp stiff. The Kappa number of the NSSC pulp is typically above 70. The NSSC pulping is "semi-chemical" in the sense that it also comprises mechanical refining of the pulp. Refining may for example be done using a disc refiner at digester pressure or at atmospheric pressure.

The fluting and liner(s) are attached to each other by arranging an adhesive between the corrugated medium and liner(s). The liner is attached to at least one surface of the corrugated medium by the adhesive. The adhesive is preferably applied on a least one surface of the fluted corrugated medium and the liner is thereafter attached to said surface. Any conventional adhesives in the area may be used. The adhesive may for example be a glue that is based on starch that can be extracted from a wide variety of plants. Some of the most common plants are maize, wheat, barley, rice, potato, tapioca and peas. The starch is preferably native, i.e. no modification of the starch has been done. The adhesive may also comprise water, sodium hydroxide and boric acid. Other additives, such as additives to improve the wet strength or adhesive bond strength may also be added. Also, other functional chemicals in order to improve e.g. moisture resistance or gelling behavior can be added, e.g. borax, glyoxal or mixtures thereof.

One important challenge when making corrugated medium and corrugated board is the resistance to humidity. When the corrugated board is exposed to humidity, water and water vapor may diffuse through the liners and soften the corrugating medium. A common solution to this problem is to increase grammage of the fluting and/or liner, but this is in conflict with environmental demands requiring lower grammage materials consuming less raw material.

Another solution is to provide a barrier layer on the liner to reduce the penetration of water and water vapor. However, this is only a partial solution since moisture diffusion may still occur on the opposite side or via the edges and consequently impact the mechanical stability of the corrugated board. Barrier layers also increase cost and typically reduce recyclability of the materials.

The fluting or corrugating medium may also be treated with hydrophobizing chemicals or coated, but this generally adds costs and may also impact the mechanical properties of the fluting negatively. High levels of hydrophobizing chemicals may also compromise the adhesion between the fluting and the liner(s).

Particularly, NSSC pulps require high levels of hydrophobizing chemicals to obtain a required level of water resistance in the finished fluting.

Broke refers to partly or fully manufactured paper or board that is discarded from paper or board making, converting, and finishing processes. During manufacturing of liner, fluting and corrugated board, substantial amounts of broke is produced. Because broke can amount to well over 5% of a machine's total production, broke is an important fiber source and the broke handling is an essential part of the papermaking process, from both financial and operational perspectives.

Broke is continuously produced, and a "broke handling system" is typically implemented to collect this resource, process it, and make it available for reuse. The broke can be wet or dry depending on from which point in the process it is obtained. The wet or dry broke is then disintegrated and optionally diluted into a slurry, or broke stock, for reuse. The broke handling system typically comprises a broke pulper which is used to disintegrate the broke into a broke stock that can be pumped and treated, and subsequently mixed with fresh stock. The term broke pulper can include a wide range of machines and may refer to both stand-alone broke pulpers and under the machine (or UTM) pulpers, which receive paper directly from the machine, including any trim. A stand-alone broke pulper is typically used to process finished reels that have been rejected, or for broke that for any reason has been baled or collected. For efficient broke handling and management, it is important that broke chemistry is monitored and controlled.

New machine concepts and increased machine speeds, combined with increased demands for source reduction, has further increased the need for pulps with improved properties.

There remains a need for new and improved fluting and liner materials and methods that combine strength, low grammage, water/moisture resistance, low chemical consumption, low cost, and/or high recyclability.

DESCRIPTION OF THE INVENTION

It is an object of the present disclosure to provide an improved method for manufacturing corrugated board comprised of liner and fluting, which solves or ameliorates at least some of the above mentioned problems.

It is a further object of the present disclosure to provide an improved method for recycling materials in manufacturing of corrugated board comprised of liner and fluting.

It is yet a further object of the present disclosure to provide an improved method for manufacturing of corrugated board wherein the reuse of broke is increased and the quality and properties of the manufactured board is maintained.

The above-mentioned objects, as well as other objects as will be realized by the skilled person in the light of the present disclosure, are achieved by the various aspects of the present disclosure.

Broke refers to partly or fully manufactured paper or board that is discarded from paper or board making, converting, and finishing processes. The broke can be disintegrated and diluted into a slurry, or broke stock, for reuse. Broke is most commonly reused in the same process or same type of process from which it was obtained.

Using NSSC pulp in the manufacture of liner is problematic because of the presence of particles and shives that have a negative effect on the appearance and optical properties of the liner. The present invention is based on the inventive realization that broke, i.e. recycled materials, obtained from manufacturing of fluting can advantageously be reused in the pulp used for manufacturing of liner. The inventors have also found that broke obtained from manufacturing of liner can advantageously be reused in the pulp used for manufacturing of fluting for corrugated board.

The broke obtained from manufacturing of fluting typically comprises higher amounts of NSSC pulp than broke from liner. Using NSSC pulp in liner is desired, as it can provide advantages in terms of improved strength and reduced cost. However, using in NSSC pulp in the manufacture of liner is typically problematic because of the presence of particles and shives that have a negative effect on the appearance and optical properties of the liner. An advantage of using NSSC pulp from broke as compared to virgin NSSC pulp, is that the NSSC pulp from broke has been subjected to additional mechanical and/or chemical treatment, which reduces the presence of particles and shives that would have a negative effect on the appearance and optical properties of the liner. This means that it may be possible to use higher amounts of NSSC pulp from broke than virgin NSSC pulp in the liner.

The broke obtained from manufacturing of liner typically comprises higher amounts of kraft pulp than broke from fluting, which can improve the mechanical strength of the fluting. Because the broke is already refined to suitable level, it can help to reduce cracking tendency in the fluting. The broke obtained from manufacturing of liner also typically includes higher amounts of internal (hydrophobizing) sizing agents kraft pulp than broke from fluting, which can improve resistance of the fluting to water and moisture.

Typically, liner and fluting are made at different facilities, however, it is also common for liner and fluting to be made at the same facility on different machines.

According to a first aspect illustrated herein, there is provided a method for manufacturing fluting and/or liner for corrugated board, comprising the step(s):
  a) using broke obtained from manufacturing of liner in the pulp used for manufacturing of fluting wherein at least 50% of the broke is external broke from the manufacturing of liner and/or
  b) using broke obtained from manufacturing of fluting in the pulp used for manufacturing of liner wherein at least 50% of the broke is external broke from the manufacturing of fluting.

With external broke is meant broke that comes from the manufacturing of a production at another production line, i.e. another paper or paperboard machine. Consequently, external broke has been produced at another location or another production line. With internal broke is meant broke that has been manufactured at the same production line, i.e. the same paper or paperboard machine. It has been found that it is beneficial to use broke from the production of liner to the production of fluting and vice versa. For the production of a fluting it may be preferred that at least 60%, preferably at least 70%, even more preferred at least 80% and even more preferred at least 90% of the broke is external broke from the manufacturing of a liner. For the production of a liner it may be preferred that at least 60%, preferably at least 70%, even more preferred at least 80% and even more preferred at least 90% of the broke is external broke from the manufacturing of fluting. It is still possible from a sustainability and economical point of view to use some amount of internal broke for the production of fluting or liner according to the present invention.

The external broke used is obtained from the manufacturing of either liner or fluting, i.e. it is not broke from a ready made corrugated board comprising both liner and fluting.

The fluting or liner can be manufactured in a paper or paperboard machine adapted for manufacturing of fluting or liner. Paper or paperboard machines for making fluting and liner are well known in the art. Typically, the machine layout comprises a stock handling section, a wet end section, a pressing section, a drying section and a calendering and/or coating section. In the wet end section, a fluting or liner web is formed by distributing and partially dewatering a pulp suspension, or stock, on one or more wires using one or more headboxes. The formed fluting or liner web can be single ply or multiply.

The formed web is typically subjected to further dewatering, which may for example include passing the web through a press section of the paper machine, where the web passes between large rolls loaded under high pressure to squeeze out as much water as possible. The press section may constitute traditional nip press units and press fabric felts and/or one or several shoe presses or extended dewatering nips. These can be run at various nip or press loads, different positions, temperatures and delays times. The press section may be provided with one or more shoe presses to maximize production. If using one or several shoe presses, these can be run at press levels above 800 kN/m, such as above 1000 kN/m, such as above 1200 kN/m, or such as such as above 1450 kN/m. The removed water is typically received by a fabric or felt.

After the press section, the web may be subjected to drying in a drying section. The drying may for example include drying the web by passing the web around a series of heated drying cylinders. Drying may typically remove the water content down to a level of about 1-15 wt %, preferably to a level of about 2-10 wt %.

Broke is formed in all sections of the paper or paperboard machine and may include wet or dry material depending on from which section it is obtained.

The method of the present disclosure comprises:
a) using broke obtained from manufacturing of liner in the pulp used for manufacturing of fluting wherein at least 50% of the broke is external broke from the manufacturing of liner or
b) using broke obtained from manufacturing of fluting in the pulp used for manufacturing of liner wherein at least 50% of the broke is external broke from the manufacturing of fluting or
a combination of the steps a) and b).

Typically, liner and fluting are made at different facilities, however, it is also common for liner and fluting to be made at the same facility on different machines.

The inventive method is preferably implemented in a plant where both liner and fluting are produced.

In a plant where both liner and fluting are produced, broke from each process may conveniently be used in the other process, i.e., broke obtained from manufacturing of liner is reused in the pulp used for manufacturing of fluting, and broke obtained from manufacturing of fluting is reused in the pulp used for manufacturing of liner. This way, the advantages of both method steps can be combined, and the waste can be minimized.

The use of the broke in steps a) and b) typically involve disintegrating and optionally diluting the broke using a broke pulper into a broke stock that can be pumped and treated, and subsequently mixed with fresh pulp.

The broke obtained from manufacturing of the liner is preferably disintegrated and optionally diluted using a broke pulper into a broke stock that can be pumped and treated, and subsequently mixed with the pulp used for manufacturing of the fluting.

The broke obtained from manufacturing of the fluting is preferably disintegrated and optionally diluted using a broke pulper into a broke stock that can be pumped and treated, and subsequently mixed with the pulp used for manufacturing of the liner.

Thus, in some embodiments, the broke used in step a) and/or b) is a broke stock.

The broke may for example be disintegrated in a vertical or horizontal pulper. The consistency may for example be in the range of 2-20 wt %, and more preferably in the range of 4-10 wt %. The disintegrated pulp is optionally further diluted.

The pH of the broke during disintegration and optional dilution is preferably in the range of 5-11 and more preferably in the range of 6-10. The temperature of the broke during disintegration and optional dilution is preferably in the range of 20-80° C. and more preferably in the range of 30-50° C. Before reuse, the broke may be deflaked or defibrated or defibered or fibrillated in order to ensure that no residual flakes or agglomerates or clumps of fibers remain. The Schopper Riegler (SR) number of the obtained broke stock is preferably in the range of 18-50 and more preferably in the range of 20-45, as determined according to ISO 5267-1.

An advantage of using pulp from broke as compared to virgin pulp, is that the pulp from broke has already been subjected to dewatering once, which reduces the presence of colloidal substances and impurities in the liquid phase, including electrolytes. This reduction can be measured by measuring the conductivity of the broke or broke stock. In some embodiments, the conductivity of the broke is less than 1200, less than 1000, less than 800, or less than 600, and more preferably less than 500, less than 450, less than 400, less than 350 or less than 300 mS/m, when disintegrated at 3.5 wt % in distilled water.

The conductivity of the obtained broke stock is preferably less than 1200, less than 1000, less than 800, or less than 600, and more preferably less than 500, less than 450, less than 400, less than 350 or less than 300 mS/m.

In some embodiments, broke obtained from manufacturing of liner and fluting is disintegrated and optionally diluted in separate broke pulpers, resulting in pure liner broke and pure fluting broke respectively. In some embodiments, internal and external broke obtained from manufacturing of liner and fluting is disintegrated and optionally diluted in a common pulp broker, resulting in a mixture of liner broke and fluting broke.

The broke obtained from manufacturing of liner typically comprises higher amounts of kraft pulp than broke from fluting. In some embodiments, the broke obtained from manufacturing of liner comprises at least 60 wt %, preferably at least 70 wt %, more preferably at least 80 wt %, kraft pulp based on dry weight of the broke.

The broke obtained from manufacturing of fluting typically comprises higher amounts of NSSC pulp than broke from liner.

"NSSC pulp" is obtained from "NSSC pulping", which in turn is defined in the background section. The NSSC pulp can be hardwood pulp or softwood pulp, or a mixture thereof. The NSSC pulp is preferably hardwood pulp or a hardwood/softwood pulp mixture with less than 15 wt % softwood, preferably less than 10 wt % softwood, and more preferably less than 5 wt % softwood. The hardwood may for example be aspen, alder, poplar, eucalyptus, birch, acacia, or beech. The NSSC pulp is preferably prepared cooked using a cooking liquor comprising sulfite, preferably $Na_2SO_3$ or $(NH_4)_2SO_3$ and a base, preferably NaOH or $Na_2CO_3$. In some embodiments the yield from the NSSC pulping is above 60%, preferably above 65%, preferably above 70%, and more preferably above 75%. The term "neutral" means that the pH of the NSSC cooking liquor is in the range of 6-10. The cooking time preferably in the range of 5 minutes to 3 hours. The cooking temperature is preferably in the range of 160-200° C. The NSSC pulp may comprise comparatively high amounts of residual lignin, such as 15-20%. The Kappa number of the NSSC pulp is typically above 70, preferably above 80, preferably above 95, and more preferably above 100, according to ISO 3260. The NSSC pulping is "semi-chemical" in the sense that it also comprises mechanical refining of the pulp. Refining may for example be done using a disc refiner at digester pressure or at atmospheric pressure. The refining can be done in one or more steps at the same or different pulp consistencies. A first refining step may preferably be done at higher consistency such as 5-35%, and a second refining step may preferably be done at lower consistency <5%.

In some embodiments, the broke obtained from manufacturing of fluting comprises less than 2%, preferably less than 1.8%, more preferably less than 1.6%, Pulmac shives (slot size 0.1 mm).

In some embodiments, the broke obtained from manufacturing of fluting comprises at least 30 wt %, preferably at least 40 wt %, more preferably at least 50 wt %, NSSC pulp based on dry weight of the broke. In some embodiments, the broke obtained from manufacturing of fluting comprises at least 60 wt %, preferably at least 70 wt %, more preferably at least 80 wt %, NSSC pulp based on dry weight of the broke. This means that adding broke obtained from manufacturing of liner which comprises at least 60 wt % kraft pulp will increase the overall kraft pulp content of the fluting.

In some embodiments, the pulp used for manufacturing of liner comprises at least 60 wt %, preferably at least 70 wt %, more preferably at least 80 wt %, kraft pulp based on dry weight of the pulp. This means that adding broke obtained from manufacturing of fluting which comprises, e.g., at least 60 wt % NSSC pulp will increase the overall NSSC pulp content of the liner.

Different amounts of broke can be used depending on the composition, quality and availability of the broke. In some embodiments, the amount of broke obtained from manufacturing of liner used in the pulp for manufacturing of fluting is in the range of 1-30 wt %, preferably in the range of 5-30 wt %, more preferably in the range of 1-20 wt %, even more preferably in the range of 5-20 wt % and even more preferred in the range of 10-20 wt %, based on dry weight of the pulp.

In some embodiments, the amount of broke obtained from manufacturing of fluting used in the pulp for manufacturing of liner is in the range of 1-30 wt %, preferably in the range of 5-30 wt %, more preferably in the range of 1-20 wt %, even more preferably in the range of 5-20 wt % and even more preferred in the range of 10-20 wt %, based on dry weight of the pulp.

For efficient broke handling and management, it is important that broke chemistry is monitored and controlled. Long delays, such as in standstills, may cause an increase microbial activity in the broke. The microbial activity can lead to changes in the broke chemistry which can in turn affect the quality and runnability when making the fluting or liner.

The broke used in the present disclosure is preferably fresh broke. Fresh broke refers to broke from fluting or liner which was disintegrated and optionally diluted less than 20 days ago, more preferably less than 15 days ago, more preferably less than 5 days ago, more preferably less than 3 days ago, and most preferably less than 1 day ago.

The broke used in the present disclosure is preferably mill broke, i.e. paper scrap and trimmings obtained from the production in the mill. The mill broke can be obtained from different sections of the production process.

In some embodiments, the broke from manufacturing of liner is obtained from the forming section, the press section and/or the drying section.

In some embodiments, the broke from manufacturing of fluting is obtained from the forming section, the press section, the drying section, and/or the corrugator.

In some embodiments, the fluting or liner is a multiply fluting or a multiply liner comprising two outer plies and at least one intermediate ply sandwiched between the outer plies, wherein the broke is used in a pulp used for preparing an intermediate ply. Placing the broke in an intermediate ply can for example reduce the effects of the broke on the appearance of the fluting or liner in which it is used.

In some embodiments, the broke in step a) obtained from manufacturing of liner improves the hydrophobicity of the manufactured fluting. The broke obtained from manufacturing of liner typically includes higher amounts of internal (hydrophobizing) sizing agents kraft pulp than broke from fluting, which can improve resistance of the fluting to water and moisture.

In some embodiments, the broke in step b) obtained from manufacturing of fluting contains less impurities and shives compared to virgin NSSC. Using in NSSC pulp in the manufacture of liner is typically problematic because of the presence of particles and shives that have a negative effect on the appearance and optical properties of the liner. An advantage of using NSSC pulp from broke as compared to virgin NSSC pulp, is that the NSSC pulp from broke has been subjected to additional mechanical and/or chemical treatment, which reduces the presence of particles and shives that would have a negative effect on the appearance and optical properties of the liner. This means that it may be possible to use higher amounts of NSSC pulp from broke than virgin NSSC pulp.

According to a second aspect illustrated herein, there is provided a fluting or liner for corrugated board obtainable by the method according to any one of the preceding claims.

The obtained fluting and liner are intended for use in corrugated board. Corrugated board comprises at least one layer of liner, which is non-corrugated, which is glued to at least one layer of fluting. For example, corrugated board may consist of a layer of fluting sandwiched between two layers of liner.

According to a third aspect illustrated herein, there is provided a corrugated board comprising a fluting and a liner, wherein the corrugated board comprises:
   i) a fluting comprising broke obtained from manufacturing of liner wherein at least 50% of the broke is external broke from the manufacturing of liner, and/or
   ii) a liner comprising broke obtained from manufacturing of fluting wherein at least 50% of the broke is external broke from the manufacturing of fluting.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

Example 1 (Comparative)

An NSSC beech pulp obtained in dry form and then disintegrated into furnish and made to 150 g/m² single ply web on a fourdrinier type pilot papermachine. The production speed was 45 m/min and temperature of the furnish was 45° C.

Example 2 (Comparative)

NSSC beech pulp as used in Example 1 was refined to a higher SR value and a web was prepared as in Example 1. The increased SR due to the refining increased especially tensile index (Geom).

Example 3

NSSC beech pulp as used in Example 1 was washed with water (40 m³ fresh water per ton of pulp) using an Eimco belt washing unit. 2.7% of the fines were removed together with colloidal substances and impurities in the liquid phase, including electrolytes. As a consequence of the washing, the pH of the pulp suspension increased, confirming the removal of electrolytes and reduction of the ash content. A web was prepared as in Example 1. A small improvement in both tensile strength and stretch was noticed.

Example 4

NSSC beech pulp as used in Example 1 was mixed with washed NSSC birch broke pulp (washed as described in Example 3). The pulps were mixed in a 50-50 ratio. A web was prepared as in Example 1. A significant improvement in both tensile strength and stretch was observed.

Example 5

In this example, washed NSSC birch broke pulp as used in Example 4 was used without any other fibers. A web was prepared as in Example 1. The tensile strength properties and stretch were further improved.

TABLE 1

Pulp compositions

|  |  | Ex 1 | Ex 2 | Ex 3 | Ex 4 | Ex 5 |
|---|---|---|---|---|---|---|
| NSSC beech | % | 100 |  |  | 50 |  |
| NSSC beech - refined | % |  | 100 |  |  |  |
| NSSC beech - washed | % |  |  | 100 |  |  |
| NSSC birch broke - washed | % |  |  |  | 50 | 100 |
| pH |  | 6.7 | 6.7 | 6.9 | 6.8 | 7.3 |
| ° SR |  | 26.0 | 32.0 | 21.5 | 24.0 | 31.0 |
| Consistency in headbox | % | 0.599 | 1.007 | 0.801 | 0.861 | 0.780 |

TABLE 2

Physical properties of formed sheets

|  |  | Ex 1 | Ex 2 | Ex 3 | Ex 4 | Ex 5 |
|---|---|---|---|---|---|---|
| Density | kg/m³ | 526 | 565 | 583 | 636 | 663 |
| Permeability, Gurley Hill | s/100 ml | 3.6 | 6.1 | 4.8 | 15 | 55 |
| Absorption, Klemm, md | mm | 63 | 49 | 60 | 42 | 26 |
| Absorption, Klemm, cd | mm | 59 | 45 | 55 | 39 | 21 |
| Tensile index, md | kNm/kg | 41.34 | 46.24 | 39.38 | 60.17 | 88.88 |
| Tensile index, cd | kNm/kg | 25.65 | 29.31 | 28.21 | 40.62 | 48.70 |
| Tensile index Geom |  | 32.56 | 36.81 | 33.33 | 49.44 | 65.79 |
| Stretch, md | % | 1.08 | 1.10 | 1.19 | 1.33 | 1.49 |
| Stretch, cd | % | 1.57 | 2.06 | 1.67 | 2.48 | 3.02 |

Unless otherwise stated, the physical properties discussed in the present disclosure are determined according to the following standards:

| Brightness C/2° + UV | ISO 2470-1 |
|---|---|
| L* C/2° + UV | ISO 5631-1 |
| a* C/2° + UV | ISO 5631-1 |
| b* C/2° + UV | ISO 5631-1 |
| Grammage | ISO 536 |
| Thickness, single sheet | ISO 534 |
| Bulk, single sheet | ISO 534 |
| Air permeability G-H | ISO 5636-5 |
| Cobb 30 s | ISO 535 |
| Moisture content 50% rh | ISO 287 |
| Scott-Bond | TAPPI T569 |
| Tensile strength | ISO 1924-3 |
| Tensile index | ISO 1924-3 |
| Tensile strength md/cd | ISO 1924-3 |
| Stretch | ISO 1924-3 |
| Tensile stiffness | ISO 1924-3 |
| Tensile stiffness index | ISO 1924-3 |
| E-modulus | ISO 1924-3 |
| TEA | ISO 1924-3 |
| TEA index | ISO 1924-3 |
| TEA index | ISO 1924-3 |
| Fracture toughness | ISO/TS 17958 |
| Fracture toughness index | ISO/TS 17958 |
| Tearing resistance | ISO 1974 |
| Tear index | ISO 1974 |
| SCT | ISO 9895 |
| SCT index | ISO 9895 |
| RCT | ISO 12192 |
| RCT index | ISO 12192 |
| Burst index | ISO 2759 |
| Bursting strength | ISO 2759 |

Unless otherwise stated, then the standard method can be applied for determining physical and mechanical properties in both cross direction (cd) and machine direction (md).

The invention claimed is:
1. A method for manufacturing fluting and/or liner for corrugated board, comprising the step(s):
 a) providing broke, obtained from manufacturing of a liner, as a pulp and manufacturing a fluting from the broke, wherein at least 50% of the broke is external broke from the manufacturing of the liner,
 or
 b) providing broke, obtained from manufacturing of a fluting, as a pulp and manufacturing a liner from the broke, wherein at least 50% of the broke is external broke from the manufacturing of the fluting,
 or both a) and b), and, c) forming a corrugated board with the fluting manufactured in step a), the liner manufactured in step b), or both.

2. The method according to claim 1, comprising the step a).

3. The method according to claim 1, comprising the step b).

4. The method according to claim 1, comprising the steps a) and b).

5. The method according to claim 1, wherein an amount of broke obtained from manufacturing of the liner is in a range of 1-30 wt %, based on a dry weight of the pulp.

6. The method according to claim 1, wherein an amount of broke obtained from manufacturing of the fluting is in a range of 1-30 wt %, based on a dry weight of the pulp.

7. The method according to claim 1, wherein the broke is mill broke.

8. The method according to claim 1, wherein the broke from manufacturing of the fluting is obtained from a forming section, a press section, a drying section, a corrugator, or any combination thereof.

9. The method according to claim 1, wherein the broke from manufacturing of the liner is obtained from a forming section, a press section, a drying section, or any combination thereof.

10. The method according to claim 1, wherein the fluting or liner is a multiply fluting or a multiply liner comprising two outer plies and at least one intermediate ply sandwiched between the outer plies, and wherein an intermediate ply is prepared with the pulp comprising the broke.

11. The method according to claim 1, wherein the broke in step a) improves the hydrophobicity of the manufactured fluting.

12. The method according to claim 1, wherein the broke in step b) contains less impurities and shives compared to virgin NSSC.

13. A fluting or liner for corrugated board obtained by the method according to claim 1.

14. A corrugated board comprising:
a fluting and a liner,
wherein
i) the fluting comprises broke from a manufacturing of a liner, wherein at least 50% of the broke is external broke from the manufacturing of liner,
ii) the liner comprises broke obtained from a manufacturing of a fluting, wherein at least 50% of the broke is external broke from the manufacturing of fluting, or
both i) and ii).

* * * * *